United States Patent
Tewari et al.

(10) Patent No.: US 10,491,584 B2
(45) Date of Patent: Nov. 26, 2019

(54) ROLE-BASED RESOURCE ACCESS CONTROL

(71) Applicant: General Electric Company, Schenectady, NY (US)

(72) Inventors: Ruchir Tewari, San Ramon, CA (US); Vineet Banga, San Ramon, CA (US); Atul Chandrakant Kshirsagar, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 15/601,831

(22) Filed: May 22, 2017

(65) Prior Publication Data
US 2018/0337915 A1    Nov. 22, 2018

(51) Int. Cl.
*H04L 29/06* (2006.01)
*H04L 12/927* (2013.01)

(52) U.S. Cl.
CPC ........ *H04L 63/0823* (2013.01); *H04L 47/808* (2013.01); *H04L 63/0869* (2013.01); *H04L 63/102* (2013.01)

(58) Field of Classification Search
CPC ......... G06F 15/173; G06F 15/16; H04L 9/32; H04L 29/06; H04L 63/0823; H04L 47/808; H04L 63/0869; H04L 63/102
USPC ...... 709/225, 229, 244, 250; 726/4, 7, 1, 22, 726/3; 707/E17.044; 713/152, 171; 715/771, 835
See application file for complete search history.

(56) References Cited

U.S. PATENT DOCUMENTS

| | | | | |
|---|---|---|---|---|
| 7,099,947 B1* | 8/2006 | Nadeau | ............... | H04L 12/4641 709/229 |
| 7,536,722 B1* | 5/2009 | Saltz | ...................... | G06F 21/33 726/20 |
| 8,793,768 B2* | 7/2014 | Beck | ...................... | G06F 21/33 726/4 |
| 9,923,905 B2* | 3/2018 | Amiri | .................... | H04L 63/123 |
| 2010/0192196 A1* | 7/2010 | Lee | ........................ | G06F 21/55 726/1 |
| 2012/0265879 A1* | 10/2012 | Casebolt | ................. | G06F 9/468 709/225 |
| 2016/0191528 A1* | 6/2016 | McMurtry | ............ | G06F 21/335 726/4 |

* cited by examiner

*Primary Examiner* — Thanhnga B Truong
(74) *Attorney, Agent, or Firm* — Fitch, Even, Tabin & Flannery LLP

(57) ABSTRACT

Systems and methods for role-based access control to computing resources are presented. In an example embodiment, a request to perform a type of access of a computing resource is received via a communication network from a process executing on a client device. Using a data store storing process identifiers and associated access control information, access control information associated with the requesting process is identified based on a process identifier of the requesting process. Based on the access control information associated with the requesting process, a determination is made whether the requesting process is allowed to perform the requested type of access of the computing resource. The request is processed based on the requesting process being allowed to perform the requested type of access of the computing resource.

19 Claims, 8 Drawing Sheets

ROLE-BASED RESOURCE ACCESS CONTROL

TECHNICAL FIELD

Embodiments of the present disclosure relate generally to data processing and, more particularly, but not by way of limitation, to a method and system for role-based access control for cloud (e.g., Internet-based) resources and services.

BACKGROUND

The advent of cloud computing resources has greatly benefited small and large organizations alike due to reduced capital expenditures in computer equipment, flexibility in adjusting to changes in processing bandwidth requirements, enhanced disaster recovery ability, and the like. As a result, the use of cloud, computing has extended beyond the traditional computing system paradigm to service other important tasks. One example of many is the collection and analysis of data to and from sensors, switches, valves, and other devices associated with industrial systems, such as manufacturing machinery, power plant equipment, aircraft engines, and the like. Such data is typically voluminous, and may employ any of several specialized data transfer protocols, such as MQTT (Message Queuing Telemetry Transport), CoAP (Constrained Application Protocol), and many others. Consequently, while network firewalls employed by cloud computing systems are adept at providing security for typical HTTP (Hypertext Transfer Protocol) communications over the Internet, these firewalls often do not support alternate protocols employed to transfer large data streams, often leading to reduced protection of cloud resources. Complicating the operation of the firewall is the use of multiple such alternate protocols from the same client device that may be receiving data from, or sending data to, multiple smaller devices.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
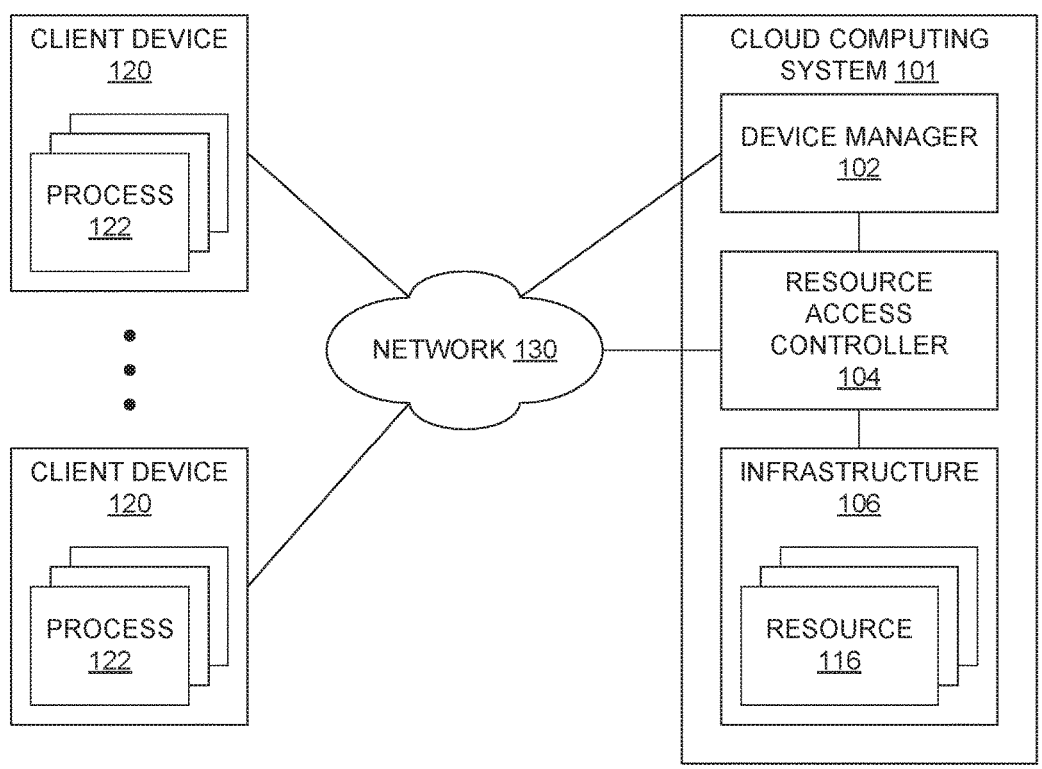
FIG. 1 is a block diagram of an example cloud computing system including an example resource access controller for controlling access to resources of the cloud computing system by one or more client devices.

FIG. 1 is a block diagram of a cloud computing system 101 including a resource access controller 104 for controlling access to one or more resources 116 provided on infrastructure 106 of the cloud computing system 101 by one or more client devices 120 via a communication network 130. As illustrated in FIG. 1, the cloud computing system 101 may also include a device manager 102. In other example embodiments, the cloud computing system 101 may include more or fewer modules or components than that shown in FIG. 1. In example embodiments, the cloud computing system 101 may operate as software-as-a-service (SaaS), platform-as-a-service (PaaS), or another type of system accessible via the communication network 130.

In example embodiments, the infrastructure 106 may include computing-related devices or systems such as, but not limited to, one or more servers, operating systems executing on one or more servers, virtual machines operating on one or more servers, data storage systems (e.g., magnetic and/or optical disk drive systems, flash data storage systems, and so on), and communication networks coupling servers, data storage systems, and other components.

The resources 116 provided on the infrastructure 106 may be any application or other executable system that may communicate with one or more of the client devices 120 to perform one or more operations at the request of the client devices 120, such as transmitting, receiving, storing, and/or retrieving data between the client devices 120 and the cloud computing system 101; processing such data on the cloud computing system 101; receiving or sending messages (e.g., messages indicating alert or emergency conditions) between the client devices 120 and the computing system 101; and so on. Example embodiments of the resources 116 may include, but are not limited to, databases, webservers, message queuing systems (e.g., RabbitMQ™), and data streaming services (e.g., Apache Kafka™, such as for transmitting or receiving industrial time-series data).

One or more of the client devices 120 may be communicatively coupled with the cloud computing system 101 by way of the communication network 130, such as a wide area network (WAN) (e.g., the Internet), a local area network, (LAN), a wireless WAN (WWAN), a wireless LAN (WLAN), a cellular telephone network (e.g., a third-generation (3G) or fourth-generation (4G) network), another communication network or connection, or some combination thereof.

The client devices 120 may include, but are not limited to, an industrial sensor, an industrial actuator (e.g., a value, switch, or the like), a communication router coupled to multiple such sensors, a desktop computer, a laptop computer, a tablet computer, a smart phone, or any other computing device or communication device capable of communicating with the cloud computing system 101 over the network 130 via messages, data packets, data streams, or other communication data structures. In an example embodiment, the client device 120 may communicate with the cloud computing system 101 using specialized protocols, such as MQTT and CoAP, as indicated above. However, other, more standard communication protocols, such as HTTP for communicating with a web server (not explicitly depicted in FIG. 1), may be employed in other embodiments.

Each process 122 executing on a client device 120, in an example embodiment, may be a single instance of a program or application executing on the client device 120, possibly executing within its own memory space and having its own identifier. One or more processes 122 may execute concurrently on the same client device 120. Moreover, in some example embodiments, a process 122 may employ one or more separate execution threads that may execute within the memory space of the process 122.

In an example embodiment of the cloud computing system 101, the device manager 102 may be configured to enroll or register one or more of the client devices 120 with the cloud computing system 101 to allow the processes 122 executing on the client devices 120 to access the resources 116 under the control of the resource access controller 104. In an example embodiment, the device manager 102 may also be configured to provision one or more of the client devices 120 with software that initiates and executes the processes 122.

The resource access controller 104 may be configured to control access to the resources 116 hosted on the infrastructure 106 of the computing system 101 by one or more client devices 120. In example embodiments, such access may be based on a particular "role" associated with each process 122 or client device 120 Each role, in turn, may identify or limit the particular resources 116, as well as one or more particular types of access to those resources 116, allowed for the process 122 or client device 120 assigned that role. Consequently, the resource access controller 104 may closely control access of each process 122 or client device 120 to the various resources 116 of the cloud computing system 101, thus enhancing the security of the cloud computing system 101, as well as the client devices 120. In some example embodiments, the roles associated with one or more of the processes 122 or client devices 120 may be changed at the cloud computing system 101 on a virtually permanent basis (e.g., by a system operator or administrator) or temporarily (e.g., via the resource access controller 104) to adjust to changes (e.g., alert conditions) in the operating environment of the client devices 120. Other aspects of the resource access controller 104 are discussed in greater detail below.

Figure 2:
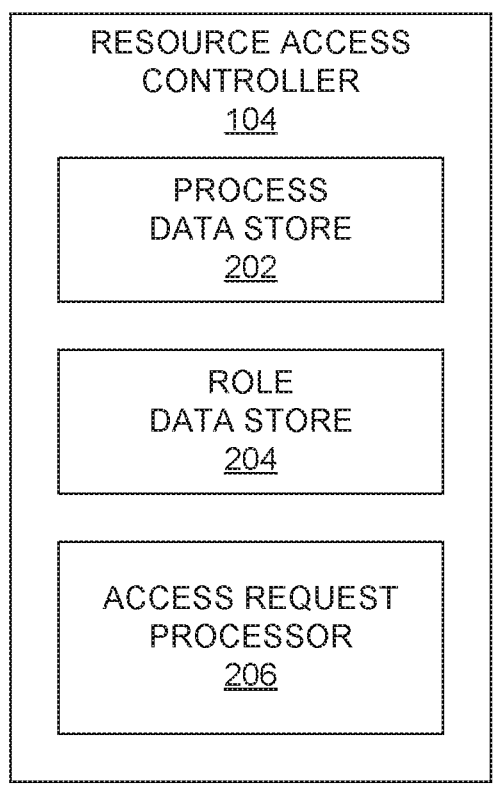
FIG. 2 is a block diagram of the example resource access controller of FIG. 1.

FIG. 2 is a block diagram of an example of the resource access controller 104 of FIG. 1. As depicted therein, the resource access controller 101 may include one or more of a process data store 202, a role data store 204, and an access request processor 206. The resource access controller 101 may include other modules or components, but such modules and components are not depicted in FIG. 2 to simplify the following discussion.

In an example embodiment, the process data store 202 is configured to associate identifiers corresponding to each client device 120 or process 122 with information indicating which resources 116 the identified client device 120 or process 122 may access, and possibly what specific types of access (e.g., create, read, write, update, delete, and so on) in which the client device 120 or process 122 may engage with each of those resources 116. In the example embodiment in which each client device 120, possibly including all processes 122 executing thereon, are identified by a single identifier, a client digital certificate used for authentication of the client device 120 may be employed as such an identifier. In another example embodiment, in which the resource access controller 104 may control access to the resources 116 at the process 122 level, each process 122 may be identified with a combination of the client certificate for the client device 120 upon which the process 122 executes, and a process 122 identifier that is at least unique among all processes 122 that execute on the client device 120.

Figure 3:
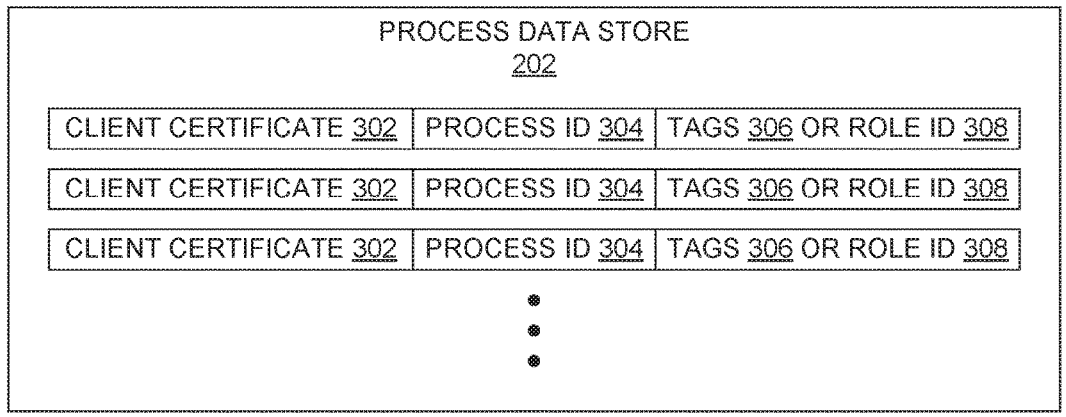
FIG. 3 is a block diagram of an example process data store of the example resource access controller of FIG. 1.

FIG. 3 is a block diagram of an example of the process data store 202 of FIG. 2. In this example embodiment, access control is process-specific, with each process 122 being identified by the client certificate 302 of the client device 120 upon which the process 122 executes, in combination with a process identifier 304 for the process 122. Also in an example embodiment, each process 122 may be identified directly with one or more access control tags 306 that may indicate which resources 116 the process 122 may access, as well as the types of access for each resource 116 in which the process 122 may engage. In another example embodiment, each process 122 may be identified indirectly with one or more access control tags 306 by way of a role identifier 308 for a particular role that the corresponding process 122 currently fills. Role identifiers 308 are discussed in greater detail with respect to FIGS. 5 and 6.

Figure 4:
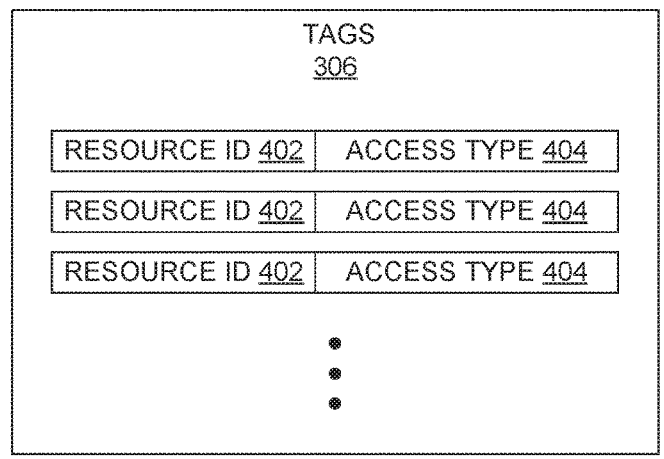
FIG. 4 is a block diagram of example allowed access control tags specified in the example process data store of FIG. 3.

FIG. 4 is a block diagram of an example of the access control tags 306 of the process data store 202 of FIG. 3. In an example embodiment, the access control tags 306 may include a resource identifier 402 for each resource 116 accessible by the process 122 associated with this particular set of access control tags 306. In addition, in some example embodiments, each resource identifier 402 in this set of access control tags 306 may be associated with one or more particular access types 404 (e.g., read-only, write-only, read-write, update, create, delete, and so on) that the associated process 122 may employ when accessing that resource 116. In example embodiments, the access control tags 306 depicted in FIG. 4 may represent a single set of access control tags 306 for one particular process 122, as illustrated in FIG. 3.

In an example embodiment, the access control tags 306 associated with a particular process 122 may represent the various resource identifiers 402 and access types 404 using any representation that allows multiple resources 402 and access types 404 to be represented simultaneously. Example representations may include a bitwise representation of each possible resource/access type combination, textual representations of the various resource/access type combinations, and others.

Figure 5:
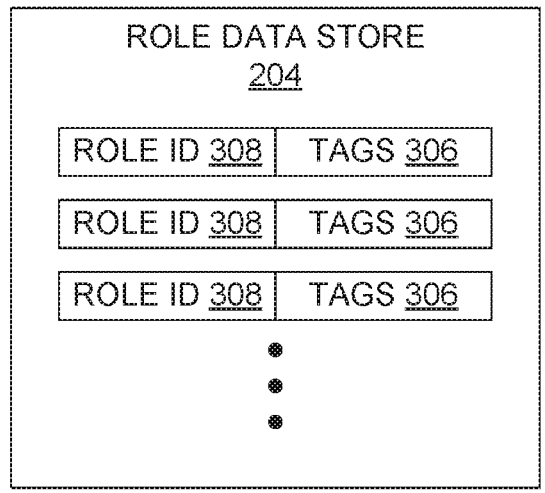
FIG. 5 is a block diagram of an example role data store of the example resource access controller of FIG. 1.

As indicated above, each set of access control tags 306 associated with a particular process 122, in an example embodiment, may represent a particular "role" for the process 122 associated with the set of access control tags 306. In an example embodiment, a process 122 may indirectly refer to a set of access control tags 306, such as by way of a process role identifier assigned to the process 112. FIG. 5 is a block diagram of an example of a role data store 202 of the resource access controller 104 of FIG. 1. In an example embodiment, each process 122 noted in the process data store 202 may be associated with a role identifier 308, as indicated above in conjunction with FIG. 3. In turn, as shown in FIG. 5, each role identifier 308 may refer to a particular set of access control tags 306, such as those depicted in FIG. 4. Such an embodiment may be useful in circumstances in which only certain combinations of access control tags 306 are available for any of the processes 122, thus resulting in a limited number of roles, and thus role identifiers 308.

Figure 6:
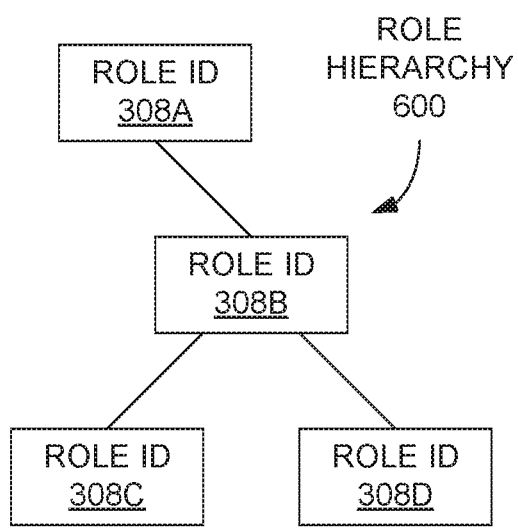
FIG. 6 is a block diagram of an example hierarchy exhibited by process roles indicated in the example role data store of FIG. 5.

In some example embodiments, each process 122 may be associated with exactly one role (e.g., indicated by a role identifier 308) and/or set of access control tags 306. In other example embodiments, one or more of the processes 122 may be associated with a single role and/or set of access control tags 306 at any particular time, but may be associated with other roles and/or sets of access control tags 306 at other times. In these latter example embodiments, the possible roles associated with one or more processes 122, and hence process identifiers 304, may be related to each other hierarchically. For example, FIG. 6 is a block diagram of an example role hierarchy 600 exhibited by process roles, as identified by various role identifiers 308A, 308B, 308C, and 308D. In an example embodiment, each role identifier 308 that resides in a higher level of the role hierarchy 600 is associated with greater, or higher-level, access to one or more resources 116. For example, as depicted in FIG. 6, role identifier 308A is associated with a higher-level role than role identifiers 308B through 308D, while role identifier 308B is associated with a higher-level role than both role identifier 308C and role identifier 308D. In an example embodiment, a higher-level role identifier 308 (e.g., role identifier 308B) includes all of the resource 116 access granted to roles associated with the lower-level role identifiers 308 (e.g., role identifiers 308C and 308D) of the higher-level role identifier 308 (e.g., role identifier 308B), plus at least one additional access type 404 associated with a resource identifier 402 that may or may not be associated with the lower-level role identifiers 308. In example embodiments, the role hierarchy 600 of FIG. 6 may be represented by way of pointers or other referential data in the role data store 202 of FIG. 5.

In an example embodiment, a particular process 122, as indicated by a process identifier 304 (FIG. 3), may be associated in the process data store 202 with a single role identifier 308 of a role hierarchy 600 during one period of time, and then associated with a higher-level or lower-level role identifier 308 at another period of time based on one or more factors or events. These embodiments are discussed below in connection with FIGS. 8 and 9.

While the example embodiments discussed above indicate that the process data store 202 of FIGS. 2 and 3 and the role data store 204 of FIGS. 2 and 5 may be distinct and separate, the information contained therein may be stored in a single data store in other example embodiments. In yet other example embodiments, the information described above regarding FIGS. 3-6 may be stored in other data formats not specifically discussed above.

Figure 7:
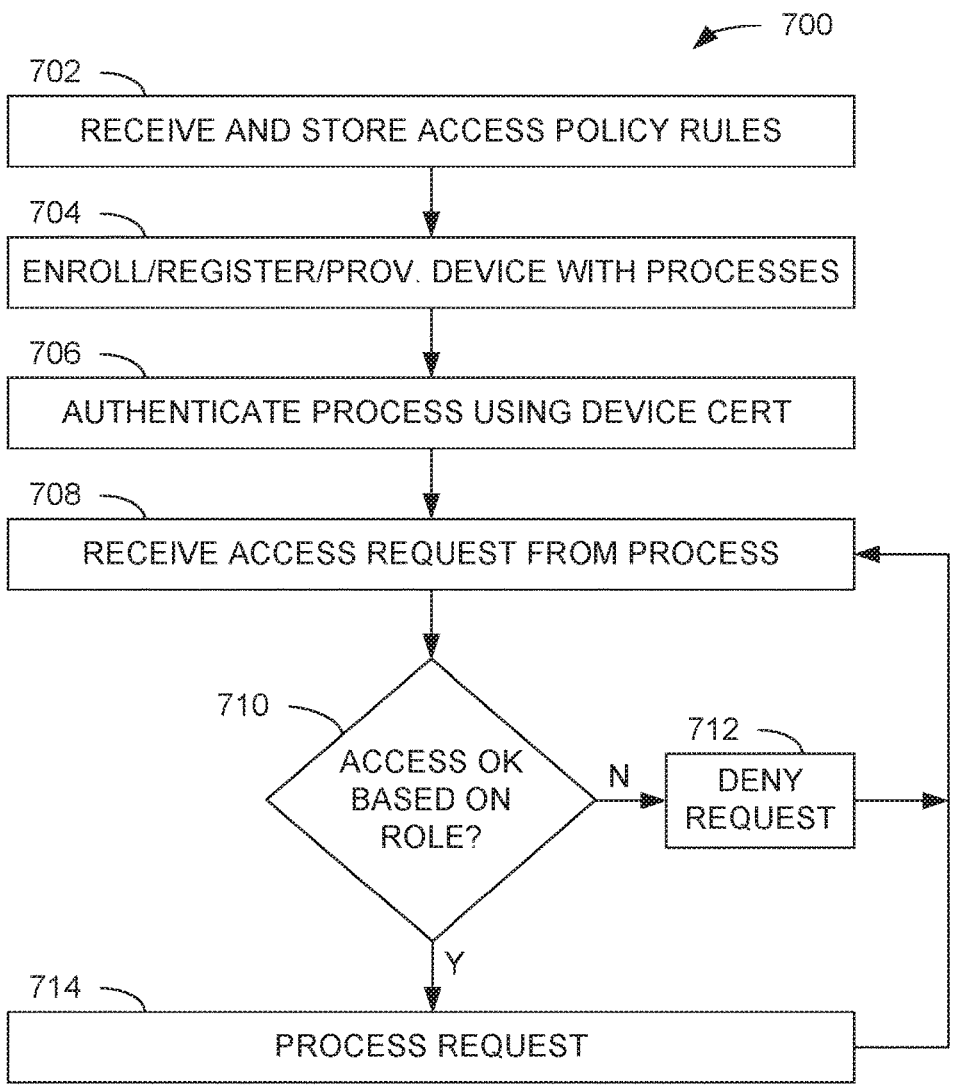
FIG. 7 is a flow diagram of an example method of the example resource access controller of FIG. 1 to control access of processes to computing resources.

FIG. 7 is a flow diagram of an example method 700 of the resource access controller 104 of FIG. 1 to control access by processes 122 to computing resources 116. While the method 700, as well as other methods presented herein, is described in view of the environment of the cloud computing system 101 of FIG. 1 and its various components of FIGS. 2-6, other systems or devices not specifically discussed herein may perform the same or similar operations in other embodiments.

In the method 700, the resource access controller 104 may receive and store access policy rules (operation 702), which may include, in an example embodiment, receiving the access control tags 306, role identifiers 308, and possibly associated information described above in conjunction with FIGS. 2-6. This information may be provided to the resource access controller 104 from a system operator or administrator system associated with the cloud computing system 101 of FIG. 1, a supervisory computing system associated with one or more of the client devices 120 of FIG. 1, or another source.

Also, the device manager 102 of the cloud computing system 101 of FIG. 1 may enroll, register, and/or provision one or more of the client devices 120 (operation 704) to facilitate access of the processes 122 of the client devices 120 to one or more of the resources 116 of the infrastructure 106 of the cloud computing system 101. In an example embodiment, enrolling or registering a client device 120 may include receiving the client certificates 302 and process identifiers 304 associated with one or more of the client devices 120 at the device manager 102, such as from a system operator or administrator associated with the cloud computing system 101 of FIG. 1, or a supervisory computing system associated with one or more of the client devices 120 of FIG. 1, as indicated above. In an example embodiment, provisioning one or more of the client devices 120 may include the device manager 102 providing (e.g., via the network 130) the software to be executed on the client devices 120, possibly including software configured to execute the processes 122 on the client devices 120.

Also during the method 700, the resource access controller 104 may authenticate one or more of the processes 122 to enable the processes 122 to access the resources 116 of the cloud computing system 101 (operation 706). In an example embodiment, the resource access controller 104 and a client device 120 may engage in a two-way certificate-based authentication process (e.g., two-way TLS (Transport Layer Security) authentication) over the network 130 by employing the client certificate 302 of the client device 120 and a server certificate associated with the resource access controller 104. Other certification methods may be employed to authenticate the one or more client devices 120 in other example embodiments.

After authentication of a client device 120, the resource access controller 104 may receive, from a process 122 executing on the client device 120 via the network 130, a request to access one of the resources 116 of the cloud computing system 101 (operation 708). In an example embodiment, the request may include a type of request (e.g., read, write, update, create, delete, and so on), along with a process identifier 304 associated with the requesting process 122.

In response to the request, the resource access controller 104, in an example embodiment, may determine whether the requested access is allowable based on a role associated with the requesting process 122 (operation 710). In example embodiments, the resource access controller 104 may determine the particular role associated with the requesting process 122 by way of determining particular access control tags 306 associated with the requesting process 122. For example, the resource access controller 104 may compare the digital certificate 302 received during the authentication of the client device 120 and the process identifier 304 received in conjunction with the request against the digital certificates 302 and the process identifiers 304 stored in the process data store 202 to determine the process role identifier 308 or the access control tags 306 associated with the requesting process 122. In the scenario in which the digital certificate 302 and process identifier 304 are associated with a particular role identifier 308 in the process data store 202, the resource access controller 104 may then compare the particular role identifier 308 against the role identifiers 308 stored in the role data store 204 to determine the access control tags 306 associated with the requesting process 122.

Once the access control tags 306 associated with the requesting process 122 have been determined, the resource access controller 104 compares the determined access control tags 306 to the requested access to determine if the requested access to the particular resource 116 is allowed. In response to the requested access not being allowed, the resource access controller 104 may deny the request (operation 712). In an example embodiment, the resource access controller 104 may return a message to the requesting process 122 via the network indicating that the request is denied. If, instead, the requested access is allowed, the resource access controller 104 may cause the requested access to be processed (operation 714). In causing the request to be processed, the resource access controller 104 may forward or direct the request to the particular resource 116 to which the request is to be directed, in an example embodiment.

Figure 8:
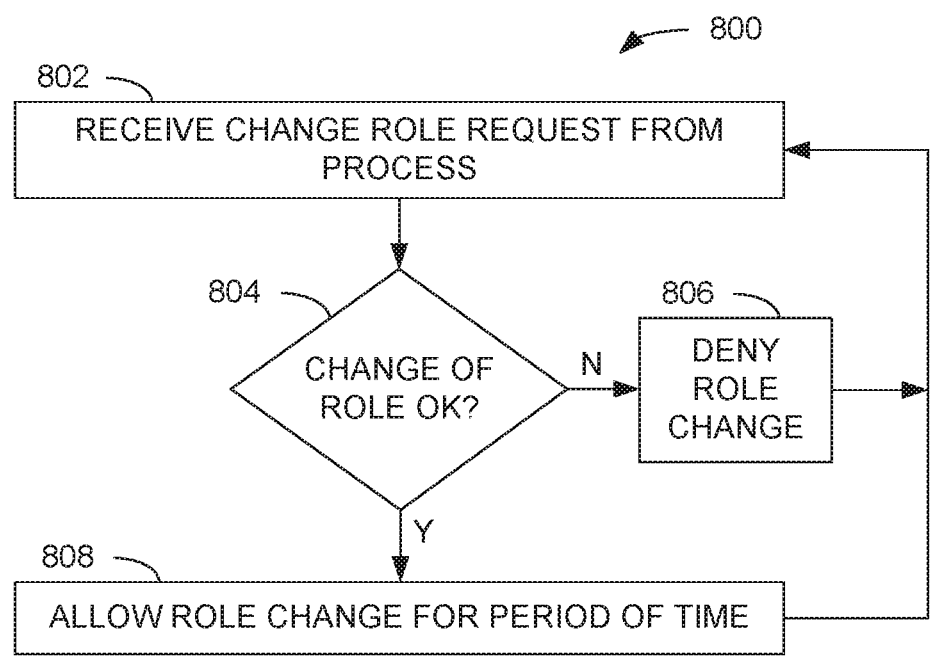
FIG. 8 is a flow diagram of an example method of the example resource access controller of FIG. 1 to handle a process request to change a role of the process.

In some example embodiments, the role assigned to, or associated with, the requesting process 122 may be altered or modified so that the request to access a particular resource 116 that is not allowed for the requesting process 122 given its current role may be allowed under a different role. To that end, one or both of the methods depicted in FIGS. 8 and 9 may be employed to facilitate a role change. For example, FIG. 8 is a flow diagram of an example method 800 of the resource access controller 104 to handle an explicit process 122 request to change a role of the process 122. In method 800, the resource access controller 104 may receive a request from a process 122 to change the role of the process 122 (operation 802), such as to a higher-level role indicated in a role hierarchy 600, an example of which is depicted in FIG. 6. In an example embodiment, the requesting process 122 may transmit such a request in response to the resource access controller 104 denying a previous request for access to a particular resource 116 (e.g., operation 712 of method 700).

In example embodiments, the request may indicate a particular desired role identifier 308 for the requesting process 122, or may just indicate a general request for a higher-level role. In response to a request for a particular higher-level role, the resource access controller 104, in an example embodiment, may determine whether the requesting process 122 may be assigned the higher-level role, such as by consulting the associated role hierarchy 600, which may or may not be specifically associated with the requesting process 122. If the requested role is not reflected in the role hierarchy 600, the resource access controller 104 may determine that the requested role change is not allowable (operation 804) and deny the change in role (operation 806). If, instead, the requested higher-level role is one indicated by way of an associated role identifier 308 in the role hierarchy 600, the resource access controller 104 may determine that the requested role change is acceptable (operation 804) and allow the role change (operation 808), such as by assigning the role identifier 308 associated with the requested higher-level role to the requesting process 122. In an example embodiment, the role change may only be effective for some limited period of time, or until a particular event, such as the completion of the request for access (e.g., the completion of a data transfer, or the transfer of a message), has occurred.

In an example embodiment in which the role change request does not indicate a specific role or role identifier 308, the resource access controller 104 may consult the appropriate role hierarchy 600 to determine if a higher-level role is available (operation 804). If a higher-level role is indicated in the role hierarchy 600, the resource access controller 104 may allow the role change (operation 808). If, instead, a higher-level role is not available (e.g., the current role assigned to the requesting process 122 is the highest in the role hierarchy 600 associated with the requesting process 122), the request to modify the role of the requesting process 122 may be denied (operation 806).

Figure 9:
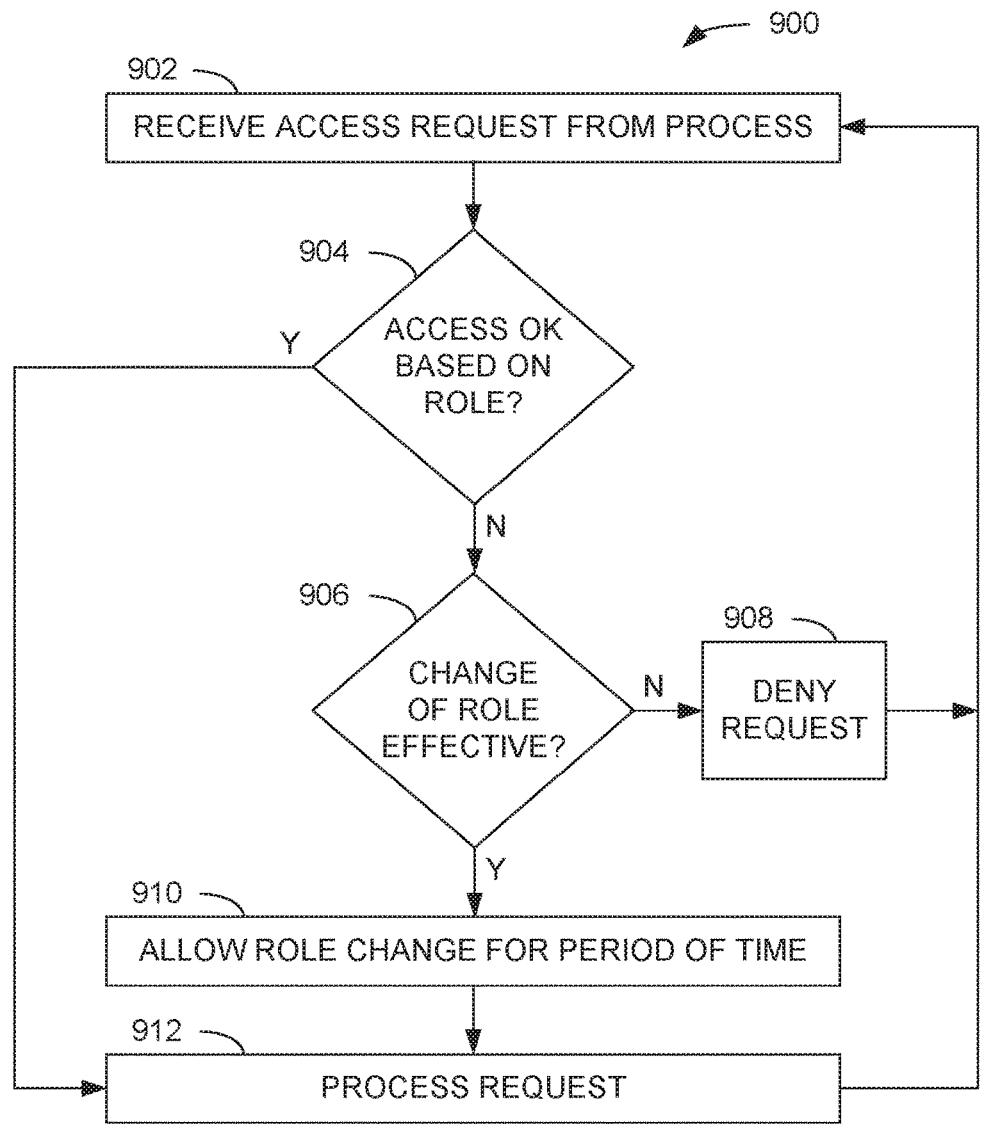
FIG. 9 is a flow diagram of an example the example resource access controller of FIG. 1 to control access of processes to computing resources by facilitating an implicit change of role for the requesting process.

FIG. 9 is a flow diagram of a method 900 of the resource access controller 104 to control access of processes 122 to computing resources 116 by facilitating an implicit change of role for the requesting process 122. In the method 900, the resource access controller 104 may receive a request to access a resource 116 (operation 902), in a fashion similar to that shown in the method 700 of FIG. 7 (e.g., operation 708). In response to the request, the resource access controller 104 may determine whether the requested access is allowable based on the current role for the requesting process 122 (operation 904), in a manner similar to that shown in the method 700 (e.g., operation 710). If the access is allowable based on the current role, the resource access controller 104 may cause the request to be processed (operation 912), such as by forwarding the request to the particular resource 116 to be accessed.

If, instead, the requested access is not appropriate or allowed for the requesting process 122 in its current role (operation 904), the resource access controller 104 may determine whether a change of role that facilitates processing of the request is allowable (operation 906), such as based on a role hierarchy 600 associated with the requesting process 122, as discussed above. If such a role change is not allowable, the resource access controller 104 may deny the request (operation 908). If, instead, such a role change is allowable for the requesting process, the resource access controller 104 may assign the requesting process the new (e.g., higher-level) role (operation 910) and cause the request to be processed by the requested resource 116 (operation 912).

In an example embodiment, the role change instituted by the resource access controller 104 may be in effective for a limited period of time, or only until some event occurs, after which the requesting process 122 may revert to its original or previous role prior to the role change. For example, the newer role may be effective for a second, five seconds, ten seconds, or some other period of time, possibly to allow multiple requests from the requesting process 122 to be received and serviced before the requesting process 122 is reverted to its previous role. In another case, the newer role may be effective until the access of the resource 116 requested by the requesting process 122 has been completed. For example, presuming that the requested access from the requesting process 122 involves transferring a stream of data from the client device 120 to a data streaming resource 116, the resource access controller 104 may assign the requesting process 122 the new role to facilitate the data stream transfer. Once the requested data stream transfer has completed, the resource access controller 104 may then revert the requesting process 122 to its previous role.

In some example embodiments described above, the resource access controller 104 may adjust the roles and/or associated access control tags 306 of the various processes 122 of the client devices 120. Further, the resource access controller 104 may make these adjustments automatically based on detected access levels and/or other operational characteristics of the various resources 116 provided by the cloud computing system 101. The resource access controller 104, in some example embodiments, may adjust the roles and/or access control tags 306 in response to input received from a system operator or administrator.

In at least some of the example embodiments described above, the use of access roles assigned to the processes 122 of one or more client devices 120 at the resource access controller 104 facilitates centralized control over access to the particular resources 116 provided by the cloud computing system 101. Thus, changes to such privileges may be facilitated on a real-time basis for all client devices 120 and their associated processes 122, as opposed to making such changes at each of the client devices 120 individually, which may number in the thousands. In addition, dynamic and adaptive control of access to the resources 116, as described herein, may result in improved security of the cloud computing system 101; as the principle of "least privilege," in which each client device 120 or associated process 122 is allowed access to only those resources 116 that the client device 120 or process 122 employs for efficient operation at any particular time, may be implemented dynamically. This capability may enhance overall network security while dynamically facilitating enhanced performance of the cloud computing system 101 in response to changing operational conditions at the cloud computing system 101 and/or the various client devices 120.

In an example embodiment, a method for role-based control of access to computing resources comprises receiving, via a communication network from a process executing on a client device, a request to perform a type of access of a computing resource; identifying, from a data store storing process identifiers and associated access control information, access control information associated with the requesting process based on a process identifier of the requesting process; determining, based on the access control information associated with the requesting process, using at least one hardware processor of a machine, whether the requesting process is allowed to perform the requested type of access of the computing resource; and based on the requesting process being allowed to perform the requested type of access of the computing resource, causing the request to be processed.

In another example embodiment, including all previous example embodiments, the access control information associated with the requesting process indicates one or more computing resources that the requesting process is allowed to access.

In another example embodiment, including all previous example embodiments, the access control information associated with the requesting process further indicates, for at least one of the indicated one or more computing resources, a type of access to the at least one of the indicated one or more computing resources allowed for the requesting process.

In another example embodiment, including all previous example embodiments, the method further comprises receiving, via the communication network, at least one text file comprising the process identifiers and the associated access control information; and storing the process identifiers and the associated access control information in the data store.

In another example embodiment, including all previous example embodiments, the at least one text file comprises at least one of a JavaScript Object Notation (JSON) file and an Extensible Markup Language (XML) file.

In another example embodiment, including all previous example embodiments, the method further comprises based on the requesting process not being allowed to perform the requested type of access of the computing resource, denying the request.

In another example embodiment, including all previous example embodiments, each process identifier and its associated access control information describe a role corresponding to the process identified by the process identifier; the requesting process corresponds to more than one role; the access control information associated with the requesting process corresponds to a first role of the requesting process; and the method further comprises based on the requesting process not being allowed to perform the requested type of access of the computing resource in the first role, determining whether a second role is available for the requesting process that allows the requested type of access of the computing resource to be performed; and based on a second role being available for the requesting process that allows the requested type of access of the computing resource to be performed, assigning the second role to the requesting process and causing the request to be processed.

In another example embodiment, including all previous example embodiments, the method further comprises reverting the requesting process from the second role to the first role after a predetermined event has occurred.

In another example embodiment, including all previous example embodiments, the predetermined event comprises the processing of the request.

In another example embodiment, including all previous example embodiments, the method further comprises reverting the requesting process from the second role to the first role after a predetermined period of time has elapsed.

In another example embodiment, including all previous example embodiments, the second role corresponds to the access control information corresponding to the first role, and to additional access control information allowing the requested type of access of the computing resource.

In another example embodiment, including all previous example embodiments, the determining whether a second role is available for the requesting process depends on whether the second role is specified in a role hierarchy associated with the requesting process.

In another example embodiment, including all previous example embodiments, the method further comprises receiving, prior to the receiving of the request, a digital certificate corresponding to the client device and the process identifier for the requesting process; and authenticating, prior to the receiving of the request, the requesting process based on the received digital certificate and the received process identifier.

In another example embodiment, including all previous example embodiments, the method further comprises performing a two-way authentication with the client device, the performing of the two-way authentication comprising the receiving of the digital certificate and the authenticating of the requesting process.

In another example embodiment, including all previous example embodiments, the computing resource comprises a data streaming service.

In another example embodiment, including all previous example embodiments, the computing resource comprises a messaging queue.

In another example embodiment, including all previous example embodiments, the computing resource comprises a database.

In another example embodiment, including all previous example embodiments, the computing resource comprises a webserver.

In an example embodiment, a system comprises one or more hardware processors; and a memory storing instructions that, when executed by at least one of the one or more hardware processors, cause the system to perform operations comprising receiving, via a communication network from a process executing on a client device, a request to perform a type of access of a computing resource; identifying, from a data store storing process identifiers and associated access control information, access control information associated with the requesting process based on a process identifier of the requesting process; determining, based on the access control information associated with the requesting process, whether the requesting process is allowed to perform the requested type of access of the computing resource; and based on the requesting process being allowed to perform the requested type of access of the computing resource, causing the request to be processed.

In an example embodiment, a non-transitory computer-readable storage medium stores instructions that, when executed by at least one hardware processor of a machine, cause the machine to perform operations comprising receiving, via a communication network from a process executing on a client device, a request to perform a type of access of a computing resource; identifying, from a data store storing process identifiers and associated access control information, access control information associated with the requesting process based on a process identifier of the requesting process; determining, based on the access control information associated with the requesting process, whether the requesting process is allowed to perform the requested type of access of the computing resource; and based on the requesting process being allowed to perform the requested type of access of the computing resource, causing the request to be processed.

Figure 10:
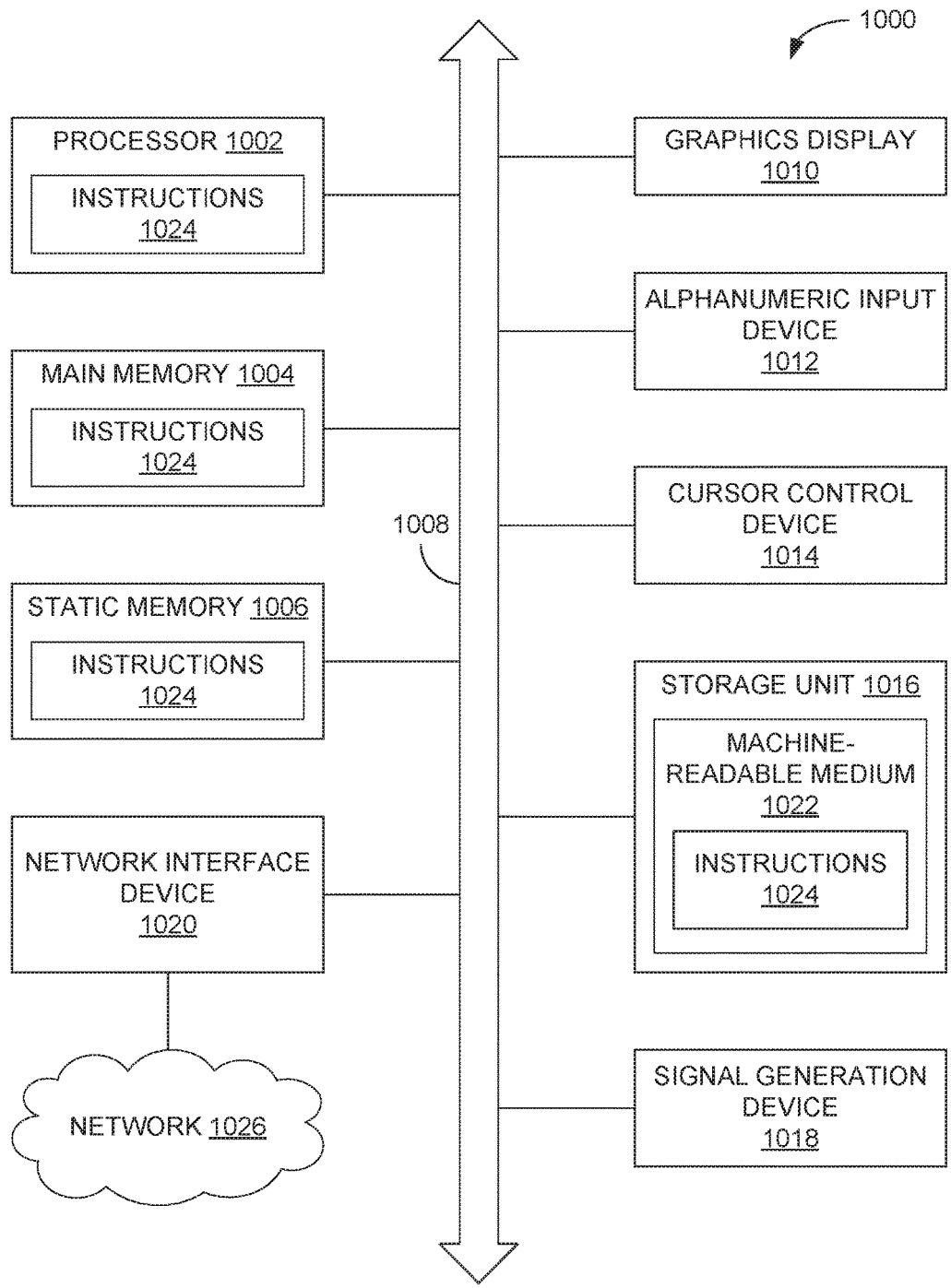
FIG. 10 is a block diagram of a machine or device in the example form of a computer system within which instructions for causing the machine or device to perform any one or more of the methodologies discussed herein may be executed.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, or a computer-readable storage medium) and perform any one or more of the methodologies discussed herein, in whole or in part. Specifically, FIG. 10 depicts the machine 1000 in the example form of a computer device (e.g., a computer) within which the instructions 1024 (e.g., software, firmware, a program, an application, an apples, an app, or other executable code) for causing the machine 1000 to perform any one or more of the methodologies discussed herein, in whole or in part.

For example, the instructions 1024 may cause the machine 1000 to execute the flow diagrams of FIGS. 7-9, as well as all example embodiments associated therewith. The instructions 1024 can transform the general, non-programmed machine 1000 into a particular machine (e.g., specially configured machine) programmed to carry out the described and illustrated functions in the manner described. Also, in example embodiments, the machine 1000 may operate as one or more of the modules or components of the cloud computing system 101 of FIG. 1 (including the device manager 102, the resource access controller 104, and the resources 116 hosted on the infrastructure 106), or any other computing system or device described herein.

In example embodiments, the machine 1000 operates as a standalone device or may be connected (e.g., networked) to other machines. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light-emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-readable medium 1022 (e.g., a tangible machine-readable storage medium) on which is stored the instructions 1024 embodying any one or more of the methodologies or functions described herein. The instructions 1024 may also reside, completely or at least partially, within the main memory 1004, within the processor 1002 (e.g., within a cache memory of the processor 1002), or both, before or during execution thereof by the machine 1000. Accordingly, the main memory 1004 and the processor 1002 may be considered machine-readable media 1022 (e.g., tangible and non-transitory machine-readable media).

In some example embodiments, the machine 1000 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1022 able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions 1024. The term "machine-readable medium" shall also be taken to include any medium, or combination of multiple media, that is capable of storing instructions 1024 for execution by a machine (e.g., machine 1000), such that the instructions 1024, when executed by one or more processors of the machine 1000 (e.g., processor 1002), cause the machine 1000 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1022 is non-transitory in that it does not embody a propagating or transitory signal. However, labeling the machine-readable medium 1022 as "non-transitory" should not be construed to mean that the medium is incapable of movement; the medium should be considered as being transportable from one physical location to another in some example embodiments. Additionally, since the machine-readable medium 1022 is tangible, the medium may be considered a machine-readable device.

The instructions 1024 may further be transmitted or received over a communications network 1026 using a transmission medium via the network interface device 1020 and utilizing any one of a number of well-known transfer protocols (e.g., Hypertext Transfer Protocol (HTTP)). Examples of communication networks 1026 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 1022 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for role-based control of access to computing resources, the method comprising:
   receiving, via a communication network from a process executing on a client device, a request to perform a type of access of a computing resource;
   identifying, from a data store storing process identifiers and associated access control information, access control information associated with the requesting process based on a process identifier of the requesting process;
   determining, based on the access control information associated with the requesting process, using at least one hardware processor of a machine, whether the requesting process is allowed to perform the requested type of access of the computing resource;
   based on the requesting process being allowed to perform the requested type of access of the computing resource, causing the request to be processed;
   wherein each process identifier and its associated access control information describe a role corresponding to the process identified by the process identifier;
   wherein the requesting process corresponds to more than one role;
   wherein the access control information associated with the requesting process corresponds to a first role of the requesting process; and
   wherein the method further comprises:
      based on the requesting process not being allowed to perform the requested type of access of the computing resource in the first role, determining whether a second role is available for the requesting process that allows the requested type of access of the computing resource to be performed; and
      based on a second role being available for the requesting process that allows the requested type of access of the computing resource to be performed, assigning the second role to the requesting process, and causing the request to be processed.

2. The method of claim 1, wherein:
   the access control information associated with the requesting process indicates one or more computing resources that the requesting process is allowed to access.

3. The method of claim 2, wherein;
   the access control information associated with the requesting process further indicates, for at least one of the indicated one or more computing resources, a type of access to the at least one of the indicated one or more computing resources allowed for the requesting process.

4. The method of claim 1, further comprising:
   receiving, via the communication network, at least one text file comprising the process identifiers and the associated access control information; and
   storing the process identifiers and the associated access control information in the data store.

5. The method of claim 4, the at least one text file comprising at least one of a JavaScript Object Notation (JSON) file and an Extensible Markup Language (XML) file.

6. The method of claim 1, further comprising:
based on the requesting process not being allowed to perform the requested type of access of the computing resource, denying the request.

7. The method of claim 1, further comprising:
reverting the requesting process from the second role to the first role after a predetermined event has occurred.

8. The method of claim 7, wherein the predetermined event comprises the processing of the request.

9. The method of claim 1, further comprising:
reverting the requesting process from the second role to the first role after a predetermined period of time has elapsed.

10. The method of claim 1, wherein the second role corresponds to the access control information corresponding to the first role, and to additional access control information allowing the requested type of access of the computing resource.

11. The method of claim 1, wherein the determining whether a second role is available for the requesting process depends on whether the second role is specified in a role hierarchy associated with the requesting process.

12. The method of claim 1, further comprising:
receiving, prior to the receiving of the request, a digital certificate corresponding to the client device and the process identifier for the requesting process; and
authenticating, prior to the receiving of the request, the requesting process based on the received digital certificate and the received process identifier.

13. The method of claim 12, further comprising:
performing a two-way authentication with the client device, the performing of the two-way authentication comprising the receiving of the digital certificate and the authenticating of the requesting process.

14. The method of claim 1, wherein the computing resource comprises a data streaming service.

15. The method of claim 1, wherein the computing resource comprises a messaging queue.

16. The method of claim 1, wherein the computing resource comprises a database.

17. The method of claim 1, wherein the computing resource comprises a web server.

18. A system comprising:
one or more hardware processors; and
a memory storing instructions that, when executed by at least one of the one or more hardware processors, cause the system to perform operations comprising:
  receiving, via a communication network from a process executing on a client device, a request to perform a type of access of a computing resource;
  identifying, from a data store storing process identifiers and associated access control information, access control information associated with the requesting process based on a process identifier of the requesting process;
  determining, based on the access control information associated with the requesting process, whether the requesting process is allowed to perform the requested type of access of the computing resource; and
  based on the requesting process being allowed to perform the requested type of access of the computing resource, causing the request to be processed;
  wherein each process identifier and its associated access control information describe a role corresponding to the process identified by the process identifier;
  wherein the requesting process corresponds to more than one role;
  wherein the access control information associated with the requesting process corresponds to a first role of the requesting process; and
  wherein the system performs further operations comprising:
    based on the requesting process not being allowed to perform the requested type of access of the computing resource in the first role, determining whether a second role is available for the requesting process that allows the requested type of access of the computing resource to be performed; and
    based on a second role being available for the requesting process that allows the requested type of access of the computing resource to be performed,
    assigning the second role to the requesting process, and causing the request to be processed.

19. A non-transitory computer-readable storage medium storing instructions that, when executed by at least one hardware processor of a machine, cause the machine to perform operations comprising:
receiving, via a communication network from a process executing on a client device, a request to perform a type of access of a computing resource;
identifying, from a data store storing process identifiers and associated access control information, access control information associated with the requesting process based on a process identifier of the requesting process;
determining, based on the access control information associated with the requesting process, whether the requesting process is allowed to perform the requested type of access of the computing resource; and
based on the requesting process being allowed to perform the requested type of access of the computing resource, causing the request to be processed;
wherein each process identifier and its associated access control information describe a role corresponding to the process identified by the process identifier;
wherein the requesting process corresponds to more than one role;
wherein the access control information associated with the requesting process corresponds to a first role of the requesting process; and
wherein the system performs further operations comprising:
  based on the requesting process not being allowed to perform the requested type of access of the computing resource in the first role, determining whether a second role is available for the requesting process that allows the requested type of access of the computing resource to be performed; and
  based on a second role being available for the requesting process that allows the requested type of access of the computing resource to be performed,
  assigning the second role to the requesting process and causing the request to be processed.

* * * * *